Oct. 22, 1935.   J. A. HUSSAR   2,018,403
MACHINE FOR TESTING AUTOMOBILE RADIATORS
Filed Jan. 10, 1934

Inventor
Julius A. Hussar,
By Bates, Goldrick & Fears
Attorneys

Patented Oct. 22, 1935

2,018,403

UNITED STATES PATENT OFFICE 2,018,403

MACHINE FOR TESTING AUTOMOBILE RADIATORS

Julius A. Hussar, Cleveland, Ohio

Application January 10, 1934, Serial No. 706,058

6 Claims. (Cl. 73—51)

This invention relates to an apparatus for testing the circulation of a cooling medium through the cooling systems of automotive motors or the like, and is especially adapted for cleaning and testing automobile radiators. The general object of the invention is to provide an apparatus for testing the cooling systems of automobiles and the like, with a minimum removal or separation of parts, and with accuracy and dependability.

A more specific object is to provide an apparatus for testing the circulation through automotive cooling systems, which apparatus will be readily adaptable to cooling systems of different capacities and sizes.

A further object is to provide an apparatus for testing the capacity and rate of flow through automobile radiators and cooling systems, which apparatus may be used to simultaneously test and clean or flush such systems.

Another object is to provide an apparatus which may be used to test the actual flow through the cooling system of an internal combustion motor under operating conditions.

Other objects of the invention will become more apparent from the following description, reference being had to the accompanying drawing in which I illustrate a preferred embodiment of my invention. The novel characteristics of the invention will be set forth in the claims.

Figure 1:
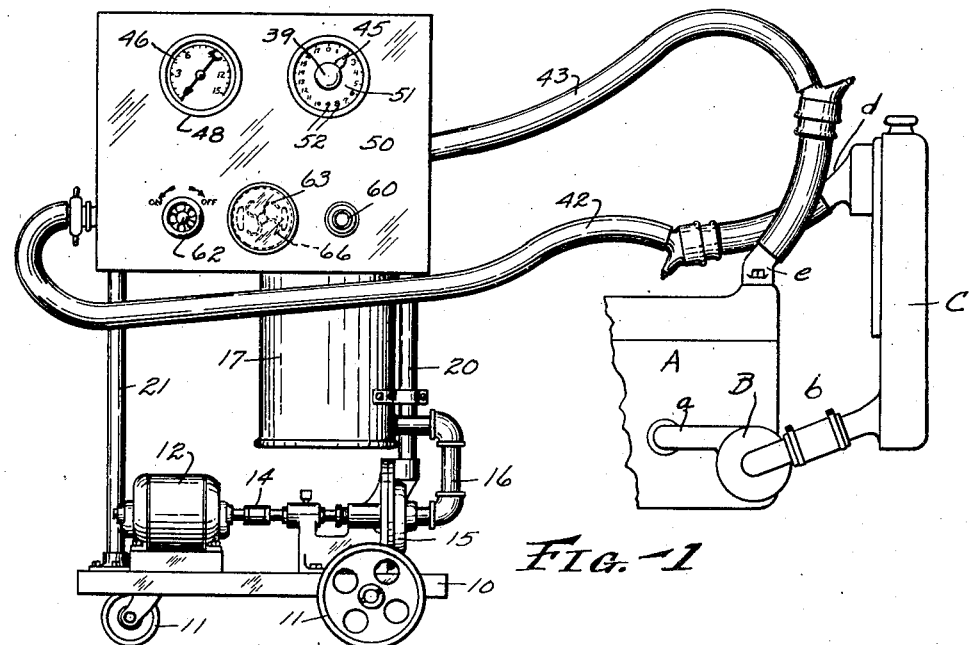
Figure 2:
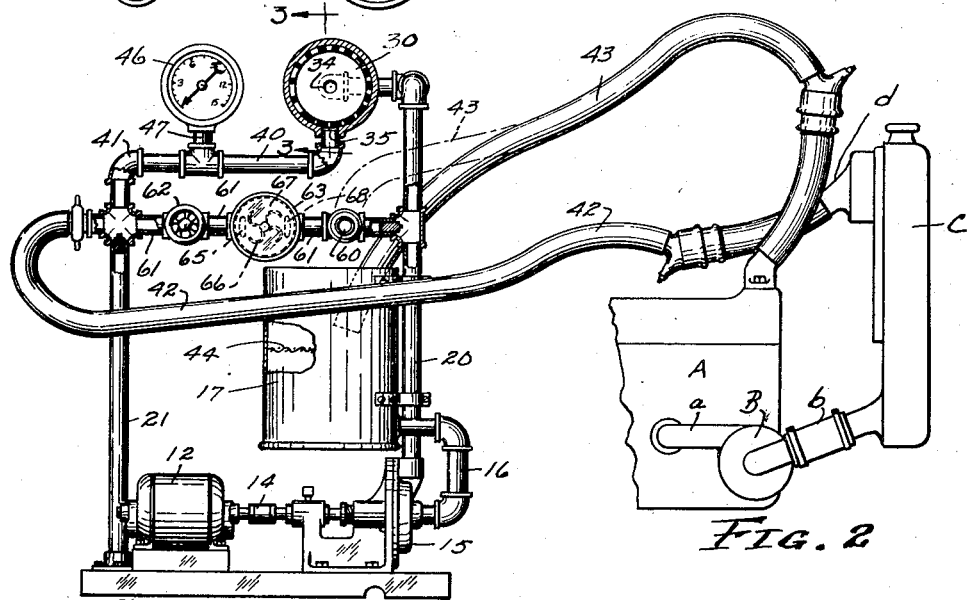
Figure 3:
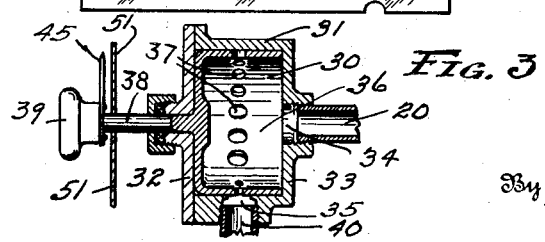

Referring now to the drawing, Fig. 1 is a front elevation of my improved apparatus; Fig. 2 is a view similar to Fig. 1, but having certain of the parts broken away to more clearly illustrate the construction thereof; Fig. 3 is a detailed section, the plane of which is indicated by the line 3—3 on Fig. 2.

Cooling systems for internal combustion motors, such as automotive engines, comprise in general water conduits which surround the walls of the combustion chambers of the motor. The water is generally circulated through such conduits by a pump operated from the motor. The pump draws the water from the bottom of a water cooler, commonly called a radiator, and forces the water upwardly through the motor conduits, where it absorbs heat from the walls of the combustion chamber. The upper parts of these conduits are connected to the upper end of the radiator, to permit the heated fluid to return to the radiator, and thereby be cooled before it is recirculated through the system.

The radiators generally comprise a series of passageways connected together at their upper and lower ends and arranged to permit the passage of a cooling means downward in comparatively small streams and in contact with the walls of the tubes or passageways of the radiator, the outer surfaces of which are exposed to the atmosphere. Hence, the heat absorbed by the water in the combustion chamber is to a great extent removed during the passage of the water through the radiator. This system is generally well known at the present time, and hence a more detailed description will not be given.

The motor cooling systems of the type above mentioned are filled with water, which act as a cooling medium. Due to the expansion and contraction of the water, in response to the heat, there is always more or less air present in the system. The water is changed only at infrequent intervals, and as the motor parts and the various conduits are generally manufactured of material which rusts readily, the cooling systems become clogged or partially clogged with rust or sludge resulting from the impurities in the water used in the system. Such clogging of radiators detracts from the efficiency of the cooling system, as the circulation of the cooling medium is restricted, and because the coating of the walls of the various parts of the cooling system prevents the heat from readily passing to and from the water or cooling medium.

My invention contemplates an apparatus for testing such cooling systems, so that their condition, especially as to circulation, may be made apparent to determine whether or not cleansing of the system is required or is complete. My invention further contemplates forcing a stream of water through the radiator, with a valve or other medium interposed in the system to selectively restrict the quantity of water to the maximum rate of flow, which normally takes place in such cooling system when it is free from all foreign matters and simultaneously, during the flow, checking the pressure of the water or liquid between the valve and the cooling system. I have found that when the pressure on the testing fluid exceeds zero, the test being made at a high point in the line, the circulation is imperfect and the degree of pressure indicates the degree of clogging of the system.

Referring again to the drawing, I have diagrammatically illustrated an automotive cooling system. As shown, there is an engine block A, which is provided with the usual cooling passageways or conduits, not shown, but which surround the combustion chambers of the motor in the usual manner. The lower portion of the engine block is connected by a suitable coupling "a" to the outlet port of a water pump B, of the usual centrifugal type, the inlet port of the pump being connected by a flexible coupling "b" to the lower end of a radiator C. The upper end of the radiator is provided with a tubular extension "d", which is connected by a suitable flexible coupling, not shown, to a similar tubular extension e, carried by the motor block A adjacent its upper end. These parts are arranged in the usual manner, so that during the normal operation of the motor the pump B causes water to be drawn from the lower part of the radiator and circulated upwardly through the block and returned to the top of the radiator, where it is returned by gravity, cooling as it returns.

In Fig. 1, I have shown my improved apparatus for testing the cooling system, connected to the radiator and the engine block to test the cooling system and especially the radiator. As shown, my improved apparatus is mounted on a platform 10, which is supported by suitable wheels 11, in such a manner that it may be readily drawn from place to place, to a position adjacent the cooling system to be tested. The base 10 supports a suitable motor, such as the electric motor 12, which is connected by a flexible coupling 14, to a pump 15. The inlet port of the pump 15 is connected by a suitable conduit 16, to the lower end of a hollow tank or container 17, while the outlet port of the pump 15 is connected by a vertically extending pipe or conduit 20, hereinafter more fully described. The conduit 20, together with a similar tubular member 21, which is secured to the platform 10 adjacent the opposite ends, provide a supporting frame, for certain operating mechanisms hereinafter to be more fully described.

During the normal operation of my improved device as a testing unit, the tank 17 is filled with water, which is drawn downwardly through the conduit 16 by the pump 15 and forced upwardly through the conduit 20 into a cylindrical sleeve type valve 30, hereinafter to be more fully described. From the valve 30 the fluid passes through conduits 40 and 41, and through a flexible hose or coupling member 42, which is secured to the intake member "d" of the radiator. The fluid then passes downwardly through the radiator and engine pump; thence upwardly to the engine block and out of such block through a flexible conduit 43, which conducts the water back into the tank 17. A suitable strainer 44, located within the tank 17, prevents the larger particles of rust, etc. from being recirculated through the system.

The rate of flow of water through each cooling system is well known, such rate differing for various motor vehicles. I therefore arrange the valve member 30 so that it may be set by the operator to various positions, each position restricting the flow through the testing system to a predetermined amount. As shown, the valve 30 comprises a cylindrical casing 31 having front and rear walls 32 and 33. The rear wall 33 of the casing is provided with an inlet port 34, which is directly connected with the conduit 20, heretofore mentioned, and which is connected with the outlet of the pump 15. The side or circumferential wall of the casing 31 is provided with an outlet port 35, which is connected to the conduit 40 leading to the radiator C. The valve is provided with a cylindrical sleeve or valve member 36, the circumferential flange of which is provided with a series of openings 37. The openings 37 are progressively arranged or graduated in size, so that by rotating the valve member any one of the openings desired may be brought into position adjacent the outlet port 35 of the casing to restrict the flow of liquid therethrough. The front end of the valve member 36 is closed and is provided with a suitable rod or stem 38 which extends forwardly through the front wall 32 of the casing 31 to the exterior of the valve. A suitable knob 39, having a pointer 45, is secured to the outermost end of the valve stem 38.

To enable the operator to properly set the valve with the desired valve opening 37 restricting the outlet opening thereof, a panel 50 is interposed between the valve and the knob 39, and is provided with a dial 51 having indicia 52 thereon which coacts with the pointer 45 of the valve stem to indicate to the operator the actual setting of the valve member 36.

The pressure gauge 46 is of the usual type and is connected by a conduit 47 to the conduit 40 heretofore mentioned. The dial of the pressure gauge preferably extends into a suitable opening 48 in the panel 50, so as to be readily visible to the operator.

If the pressure gauge indicates that the system is clogged,—that is, if the gauge indicates an excess of pressure due to the fact that more fluid passes through the selected port in the valve 30 than can pass through the cooling system, the apparatus may then be used to flush or cleanse the system. This is accomplished by running a water supply to the reservoir 17 and connecting the flexible conduit 43 to a suitable drain. During the cleansing operation, the pressure gauge may be used to indicate the results of said operation. However, after the cleansing has been completed, the flexible conduit is again returned to the reservoir 17, and the apparatus used to test the system as heretofore explained.

I have also arranged my apparatus to test the circulation of the cooling medium through the cooling system under actual operating conditions of the engine and under the impulse of the pump B of the cooling system of the engine. To so test the system, I connect the flexible member 43 between the engine outlet "e", heretofore mentioned and a connector 60, which projects through the panel 50, heretofore mentioned. The connector 60 is connected to the conduit 41 of the testing system by a conduit 61. Interposed between the connector 60 and the conduit 41 is a valve 62 and a flow indicator 63. The motor 12 of the testing system is stopped, and the valve 30 positioned to entirely block the passageway of liquid therethrough. The valve 62 which heretofore was closed, is now opened, and the engine A is operated. The pump B will then circulate the water through the motor A, the conduit 43, the connector 60, the flow indicator 63, the conduit 42, and radiator C, which returns the water to the pump B. The flow is then indicated by the flow indicator 63.

I have shown a vane type flow indicator having spaced inlet and outlet ports 65 and 68, with a rotatable vane 66 mounted therebetween. A glass or other transparent dial 67 covers the front of the flow indicator and permits the operator to watch the rotation of the vane 66 and thereby determine whether or not the pump B is circulating the water through the system. While I have shown a most simple type of flow indicator, I nevertheless contemplate that any suitable type of flow meter may be used to more accurately indicate the condition of the pump.

From the foregoing description, it will become readily apparent that I have provided an apparatus for efficiently testing the circulation of the cooling liquid through the cooling systems of internal combustion motors, and which apparatus is arranged to be set to test various cooling systems having different capacities, or may be set to test the circulation through the system under actual operating conditions, and I have so arranged the apparatus that only one connection in the cooling system is parted, such connection preferably being the upper connection between the motor and the radiator.

I claim:

1. An apparatus for testing the condition of a cooling system of an internal combustion motor, comprising means including a conduit in series with the system to circulate fluid under pressure through the system, settable means in the conduit and a visible indicating means associated with the settable means for variably restricting and indicating the flow of fluid therethrough so that the conduit capacity may be set to correspond with the circulating capacity of the system to be tested when free from foreign substances, and means for measuring the pressure of fluid in the conduit between said settable means and the system.

2. An apparatus for testing the circulation through a cooling system comprising a pressure fluid supply, a conduit from said supply having one end thereof connected to the supply and the other end arranged to be connected to a point in the cooling system to circulate a fluid therethrough, a settable valve disposed in the conduit for variably restricting the flow to the capacity flow of the system when free from foreign substances, an indicator coacting with a settable part of said valve to indicate the setting thereof, and a pressure gauge connected to said conduit between said valve and said cooling system.

3. An apparatus for testing the circulation through the cooling systems of internal combustion engines, comprising a fluid reservoir, a pump, a pump operating means, a conduit between the intake of said pump and said reservoir, a conduit having one end thereof connected to the outlet of said pump and the other end arranged to be connected to a point in the cooling system of the engine to circulate a fluid therethrough, a settable valve disposed in the second named conduit between the pump and engine for variably restricting the flow to the capacity flow of the system when free from foreign substances, an indicator coacting with a settable part of said valve to indicate the setting thereof, and a pressure gauge connected to said second named conduit between said valve and said engine.

4. An apparatus for testing the circulation through the cooling systems of internal combustion engines, comprising a fluid reservoir, a pump, a pump operating means, a conduit between the intake of said pump and said reservoir, a conduit having one end thereof connected to the outlet of said pump and the other end arranged to be connected to a point in the cooling system of the engine to circulate a fluid therethrough, a settable valve having a series of independent openings arranged to be disposed selectively in the second named conduit between the pump and cooling system for variably restricting the flow to the capacity flow of the system when free from foreign substances, and a visible indicator coacting with a settable part of said valve to indicate the setting thereof.

5. An apparatus for testing the circulation through the cooling systems of internal combustion engines, comprising a fluid supply, a pump connected therewith, a pump operating means, a conduit having one end thereof connected to the outlet of said pump and the other end arranged to be connected to a point in the cooling system of the engine to circulate a fluid therethrough, a sleeve valve disposed in the second named conduit between the pump and engine, for variably restricting the flow to the capacity flow of the system when free from foreign substances, said valve having a series of progressively graduated openings arranged to be selectively interposed in the conduit, each opening arranged to restrict the flow through the conduit to a predetermined amount, a valve handle, a pointer thereon, a dial, indices carried by the dial and coacting with said pointer to visibly indicate the opening which is restricting the flow through the conduit, and a pressure gauge connected to said second named conduit between said valve and said engine.

6. An apparatus for testing the circulation through automotive radiators comprising a fluid pump, a conduit between said pump and one end of the radiator, a reservoir, connections between the other end of said radiator and the reservoir, and between the pump and the reservoir, a valve located in said first-named conduit for variably restricting the flow to the capacity flow of the system when free from foreign substances, said valve having a plurality of open positions, means to adjust the valve to select a predetermined open position, indicating means coacting with said aforesaid means to visibly indicate the position of said valve to the operator, and a visible pressure indicator connected to said first-named conduit at a point between said valve and the engine.

JULIUS A. HUSSAR.